(12) United States Patent
Kovacheva et al.

(10) Patent No.: US 10,873,501 B2
(45) Date of Patent: Dec. 22, 2020

(54) METHODS, SYSTEMS AND APPARATUS TO PROPAGATE NODE CONFIGURATION CHANGES TO SERVICES IN A DISTRIBUTED ENVIRONMENT

(71) Applicant: VMware, Inc., Palo Alto, CA (US)

(72) Inventors: Diana Kovacheva, Sofia (BG); Miroslav Mitevski, Sofia (BG); Gospodin Gochkov, Sofia (BG); Ivo Petkov, Sofia (BG); Radoslav Asparuhov, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 15/374,492

(22) Filed: Dec. 9, 2016

(65) Prior Publication Data

US 2018/0167275 A1 Jun. 14, 2018

(51) Int. Cl.
*H04L 12/24* (2006.01)
(52) U.S. Cl.
CPC .......... *H04L 41/0816* (2013.01); *H04L 41/20* (2013.01)
(58) Field of Classification Search
CPC .......................... H04L 41/0816; H04L 41/20
See application file for complete search history.

(56) References Cited

U.S. PATENT DOCUMENTS

| | | | |
|---|---|---|---|
| 6,539,427 B1 * | 3/2003 | Natarajan | H04L 41/00 709/223 |
| 7,213,246 B1 | 5/2007 | van Rietschote et al. | |
| 8,261,295 B1 * | 9/2012 | Risbood | G06F 9/44505 719/328 |
| 8,805,978 B1 * | 8/2014 | Anthonisamy | G06F 9/5072 709/208 |
| 8,880,690 B1 * | 11/2014 | Kennedy | H04L 41/0813 709/224 |

(Continued)

FOREIGN PATENT DOCUMENTS

WO    WO-2016024838 A1 *  2/2016  ............ G06F 21/00

OTHER PUBLICATIONS

"Final Office Action", issued by the United States Patent and Trademark Office dated Mar. 5, 2019, in connection with U.S. Appl. No. 15/368,286 (11 pages).

(Continued)

*Primary Examiner* — Blake J Rubin
(74) *Attorney, Agent, or Firm* — Hanley, Flight & Zimmerman, LLC

(57) ABSTRACT

Methods, apparatus and articles of manufacture to propagate node changes in a cluster of nodes and reconfigure services based on the node changes in a cloud computing environment are disclosed. Example methods disclosed herein include analyzing a node change event message at a first node of the plurality of nodes to identify a node change event type contained in the node change event message. The node change event type corresponds to a node change event experienced by a second node of the plurality of nodes. Example methods also include selecting, based on the node change event type, a script from a data storage installed in the first node, and reconfiguring, by executing the script at the first node, a service supported by the first node. Still further example methods, include broadcasting, to the plurality of nodes including the first node, the node change event message from the second node.

20 Claims, 9 Drawing Sheets

(56) References Cited

U.S. PATENT DOCUMENTS

| | | | |
|---|---|---|---|
| 8,881,129 B1* | 11/2014 | McKinnon | G06Q 10/10 717/168 |
| 9,128,627 B1 | 9/2015 | Bachu et al. | |
| 9,201,558 B1* | 12/2015 | Dingman | G06F 3/048 |
| 9,460,028 B1* | 10/2016 | Raizen | G06F 11/00 |
| 9,612,924 B1 | 4/2017 | Joseph et al. | |
| 9,882,855 B1* | 1/2018 | Twitchell | G06F 9/45558 |
| 9,979,609 B2* | 5/2018 | Kurabayashi | H04L 41/24 |
| 10,009,432 B1* | 6/2018 | Tang | H04L 67/22 |
| 10,055,311 B1* | 8/2018 | Troyan | G06F 11/1438 |
| 10,079,877 B2* | 9/2018 | Paramasivam | H04L 67/28 |
| 10,148,493 B1* | 12/2018 | Ennis, Jr. | H04L 41/0803 |
| 10,165,036 B1* | 12/2018 | Gigliotti | H04L 67/02 |
| 10,169,035 B1* | 1/2019 | Caspi | G06F 8/73 |
| 10,205,701 B1* | 2/2019 | Voss | H04L 61/2015 |
| 10,212,034 B1* | 2/2019 | Carranza Giotto | H04L 41/0816 |
| 10,412,022 B1* | 9/2019 | Tang | H04L 47/781 |
| 10,484,334 B1* | 11/2019 | Lee | H04L 63/0245 |
| 2002/0073236 A1* | 6/2002 | Helgeson | G06F 16/258 709/246 |
| 2006/0010176 A1* | 1/2006 | Armington | G06F 9/4856 |
| 2006/0021014 A1* | 1/2006 | Hartman | G06F 8/61 726/6 |
| 2006/0106585 A1* | 5/2006 | Brown | G06F 8/20 703/1 |
| 2008/0086564 A1* | 4/2008 | Putman | H04L 29/06 709/227 |
| 2009/0019535 A1* | 1/2009 | Mishra | G06Q 30/04 726/12 |
| 2009/0119538 A1 | 5/2009 | Scales et al. | |
| 2009/0204981 A1* | 8/2009 | Karino | G06F 11/2023 719/328 |
| 2009/0222815 A1 | 9/2009 | Dake | |
| 2010/0125844 A1* | 5/2010 | Mousseau | G06F 9/50 718/1 |
| 2011/0010515 A1 | 1/2011 | Ranade | |
| 2011/0107406 A1* | 5/2011 | Frost | G06F 9/45558 726/6 |
| 2012/0110574 A1* | 5/2012 | Kumar | G06F 9/45558 718/1 |
| 2013/0091376 A1 | 4/2013 | Raspudic et al. | |
| 2013/0185716 A1 | 7/2013 | Yin et al. | |
| 2013/0204746 A1* | 8/2013 | Lee | G06Q 30/0625 705/26.62 |
| 2013/0290531 A1* | 10/2013 | Azlin | H04L 67/16 709/225 |
| 2013/0346803 A1 | 12/2013 | Chiruvolu et al. | |
| 2014/0059226 A1* | 2/2014 | Messerli | G06F 9/5072 709/226 |
| 2014/0108665 A1* | 4/2014 | Arora | H04L 67/141 709/227 |
| 2014/0280961 A1* | 9/2014 | Martinez | H04L 41/5054 709/226 |
| 2014/0282889 A1* | 9/2014 | Ishaya | G06F 9/5072 726/4 |
| 2014/0283077 A1* | 9/2014 | Gallella | G06F 21/53 726/24 |
| 2014/0298091 A1* | 10/2014 | Carlen | H04L 65/80 714/15 |
| 2014/0304352 A1* | 10/2014 | Chaudhary | G06F 9/5011 709/208 |
| 2014/0304399 A1* | 10/2014 | Chaudhary | H04L 41/5009 709/224 |
| 2015/0058447 A1* | 2/2015 | Albisu | H04L 67/02 709/219 |
| 2015/0113142 A1* | 4/2015 | Adolph | H04L 47/70 709/226 |
| 2015/0113533 A1* | 4/2015 | Hui | G06F 9/45533 718/1 |
| 2015/0135084 A1* | 5/2015 | Rosenberger | H04L 41/5041 715/738 |
| 2015/0212834 A1* | 7/2015 | Lee | G06F 9/45533 719/327 |
| 2015/0293764 A1* | 10/2015 | Visvanathan | G06F 8/36 717/102 |
| 2015/0304233 A1* | 10/2015 | Krishnamurthy | H04L 47/762 709/226 |
| 2015/0341421 A1* | 11/2015 | Chauhan | H04L 67/10 709/203 |
| 2016/0203202 A1 | 7/2016 | Merriman et al. | |
| 2017/0070536 A1* | 3/2017 | Mortman | H04L 63/20 |
| 2017/0161347 A1* | 6/2017 | Raza | G06F 16/26 |
| 2017/0220431 A1 | 8/2017 | Joshi et al. | |
| 2017/0262519 A1 | 9/2017 | Horowitz et al. | |
| 2017/0272321 A1* | 9/2017 | Ramos da Rocha | H04L 41/0816 |
| 2017/0272335 A1* | 9/2017 | Hamlin | H04L 41/5045 |
| 2017/0329635 A1* | 11/2017 | Rathke | G06F 17/5009 |
| 2017/0339013 A1* | 11/2017 | Allen | H04L 41/0826 |
| 2017/0351536 A1* | 12/2017 | Kamalakantha | G06F 9/45558 |
| 2017/0366624 A1* | 12/2017 | Tsang | H04L 67/16 |
| 2018/0157524 A1* | 6/2018 | Saxena | H04L 63/0236 |
| 2018/0157560 A1 | 6/2018 | Gochkov et al. | |
| 2018/0191599 A1* | 7/2018 | Balasubramanian | H04L 67/148 |
| 2019/0028355 A1* | 1/2019 | Subramanian | H04L 41/12 |

OTHER PUBLICATIONS

United States Patent and Trademark Office, "Non-Final Office action," issued in connection with U.S. Appl. No. 15/368,286, dated Sep. 13, 2018, 11 pages.

United States Patent and Trademark Office, "Final Office Action", issued in connection with U.S. Appl. No. 15/368,286, dated Dec. 13, 2019, (12 pages). (Copy not provided as this is a USPTO document. Applicant will provide document upon request from Examiner.).

United States Patent and Trademark Office, "Non-Final Office Action", issued in connection with U.S. Appl. No. 15/368,286, dated Jul. 5, 2019, (11 pages). (Copy not provided as this is a USPTO document. Applicant will provide document upon request from Examiner.).

United States Patent and Trademark Office, "Notice of Allowance", issued in connection with U.S. Appl. No. 15/368,286, dated May 13, 2020, (9 pages). (Copy not provided as this is a USPTO document. Applicant will provide document upon request from Examiner.).

United States Patent and Trademark Office, "Supplemental Notice of Allowance", issued in connection with U.S. Appl. No. 15/368,286, dated Jun. 30, 2020, (6 pages).

* cited by examiner

METHODS, SYSTEMS AND APPARATUS TO PROPAGATE NODE CONFIGURATION CHANGES TO SERVICES IN A DISTRIBUTED ENVIRONMENT

FIELD OF THE DISCLOSURE

This disclosure relates generally to cloud computing and, more particularly, to propagating node configuration changes to services in a cloud computing environment.

BACKGROUND

Virtualizing computer systems provide benefits such as an ability to execute multiple computer systems on a single hardware computer, replicating computer systems, moving computer systems among multiple hardware computers, and so forth.

"Infrastructure-as-a-Service" (also commonly referred to as "IaaS") generally describes a suite of technologies provided by a service provisioner as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may include many processing units (e.g., servers). Other components of a cloud computing environment include storage devices, networking devices (e.g., switches), etc. Current cloud computing environment configuration relies on much manual user input and configuration to install, configure, and deploy the components of the cloud computing environment.

Figure 1:
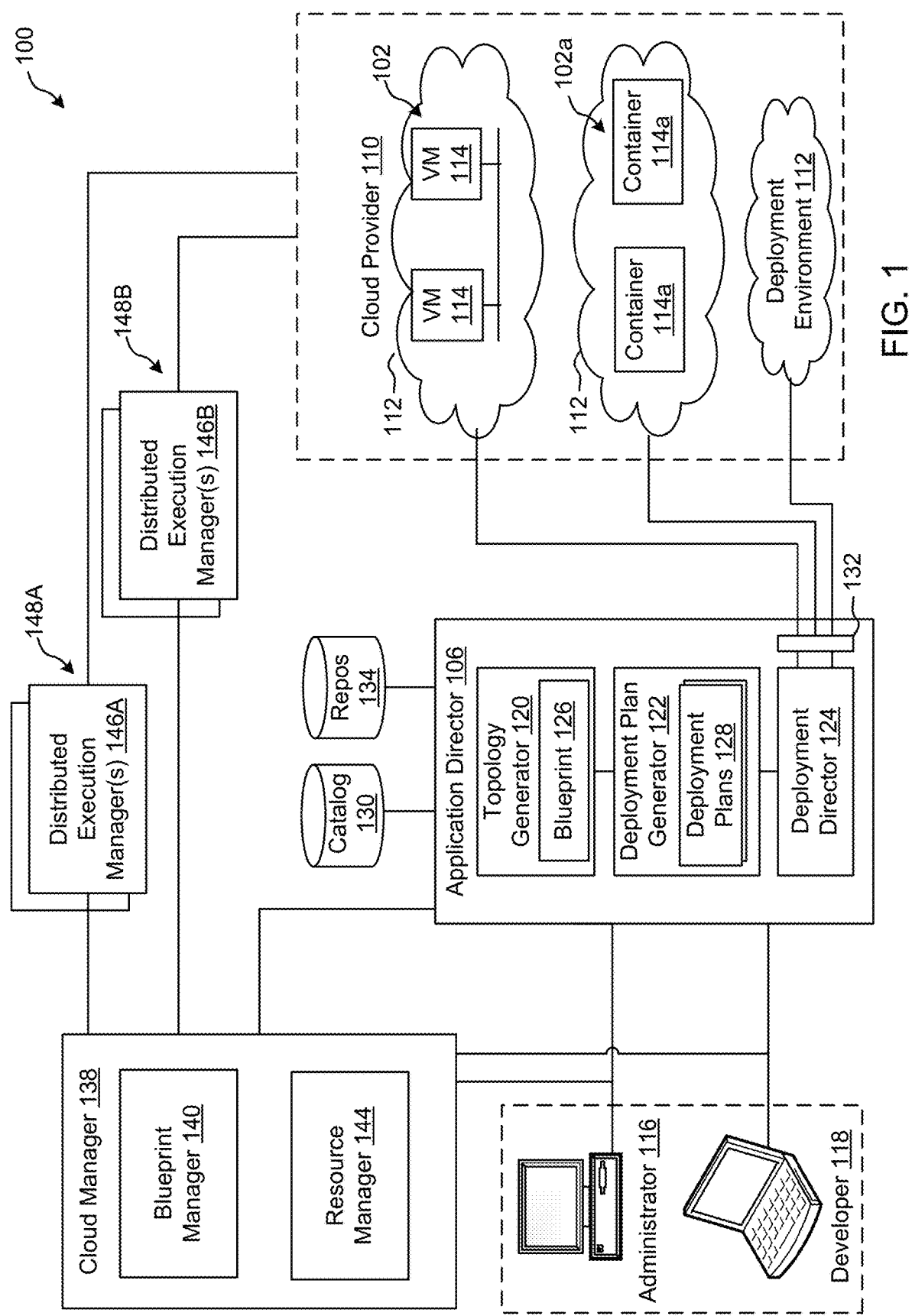
FIG. 1 depicts an example system constructed in accordance with the teachings of this disclosure for managing a cloud computing platform.

The figures are not to scale. Wherever possible, the same reference numbers will be used throughout the drawing(s) and accompanying written description to refer to the same or like parts. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

DETAILED DESCRIPTION

Example methods, systems, and apparatus to propagate node configuration changes to services in a distributed environment are disclosed herein. An example apparatus disclosed herein includes a first node of a cluster of nodes. The first node includes a node change event server to identify a node change event type in an event message generated by a second node of the cluster of nodes. In some examples, the event message indicates that a node change event corresponding to the node change event type was experienced by the second node. The example first node also includes a script library containing a script folder corresponding to the node change event type. The example script folder contains at least one script to be executed by the node change event server in response to the event message. The script, when executed, reconfigures a service supported by the first node. In some disclosed examples, the second node is implemented using a virtual appliance. In further examples, the script, when executed, reconfigures the service to accommodate the node change event. In still further examples, the node change event type is at least one of 1) adding the second node to the cluster, 2) removing the second node from the cluster, and 3) promoting the second node to lead node. In some examples the script folder is a first script folder and the script is a first script. Further, the script library includes a plurality of script folders corresponding to respective node change event types and the script folders containing respective scripts. In still further examples, the first script, when executed, causes the service to be shut down, reconfigured, and restarted. In yet further examples, the node change event server includes an event analyzer to analyze the event message to identify the node change event type and to further identify at least one node identifier. In some examples, node identifier identifies at least one of the second node, a lead node of the cluster, or replica nodes included in the cluster.

Example methods for propagating node change events to a plurality of nodes included in a cluster are also disclosed herein. Example methods include analyzing, by executing an instruction with a processor, a node change event message at a first node of the plurality of nodes to identify a node change event type contained in the node change event message. The node change event type corresponds to a node change event experienced by a second node of the plurality of nodes. Example methods further include selecting, based on the node change event type, and by executing an instruction with the processor, a script from a data storage installed in the first node. In addition, the example methods include reconfiguring, by executing the script at the first node, a service supported by the first node. Further example methods include broadcasting, to the plurality of nodes including the first node, the node change event message from the second node of the plurality of nodes. In some examples, the node change event type is one of a node added event type, a node removed event type and a node promoted event type. In still further example methods, the service is a first service and the script is a first script, and the methods further include selecting, based on the node change event type, a script folder, from the data storage, the script folder containing the first script and a second script, and reconfiguring, by executing the second script at the first node, a second service supported by the first node. In yet further example methods the reconfiguring of the service includes reconfiguring a first service component on the first node to enable communication with a second service component on the second node. In yet other examples, the second node generates and broadcasts the node change event message in response to experiencing the node change event. In some examples, the second node included in the plurality of nodes is implemented using a virtual appliance.

Example instructions for execution by a virtual appliance are also disclosed herein. In some examples, the disclosed instructions cause the virtual appliance to analyze a node change event message to identify a node change event type contained in the node change event message. The node change event type corresponds to a node change event experienced on a second virtual appliance. Further instructions cause the virtual appliance to select, based on the node change event type, a script from a data storage installed in the first virtual appliance, and reconfigure, by executing the script, a service supported by the first virtual appliance. In some examples, the node change event message is supplied to the first virtual appliance by the second virtual appliance. The node change event type can be one of a node added event type, a node removed event type and a node promoted event type. In further examples, the service is a first service and the script is a first script, and the instructions further to cause the first virtual appliance to select, based on the node change event type, a script folder, from the data storage, the script folder containing the first script and a second script, and reconfigure, by executing the second script, a second service supported by the first virtual appliance. In still further examples, the instruction to reconfigure the service by executing the script includes reconfiguring a first component of the service installed on the first virtual appliance to operate with a second component of the service installed on the second virtual appliance. In yet further examples, executing the script causes the service to stop operating on the first virtual appliance, to be reconfigured on the first virtual appliance, and to be restarted on the first virtual appliance.

Cloud computing is based on the deployment of many physical resources across a network, virtualizing the physical resources into virtual resources, and provisioning the virtual resources to perform cloud computing services and applications. Example systems for virtualizing computer systems are described in U.S. patent application Ser. No. 11/903,374, entitled "METHOD AND SYSTEM FOR MANAGING VIRTUAL AND REAL MACHINES," filed Sep. 21, 2007, and granted as U.S. Pat. No. 8,171,485, U.S. Provisional Patent Application No. 60/919,965, entitled "METHOD AND SYSTEM FOR MANAGING VIRTUAL AND REAL MACHINES," filed Mar. 26, 2007, and U.S. Provisional Patent Application No. 61/736,422, entitled "METHODS AND APPARATUS FOR VIRTUALIZED COMPUTING," filed Dec. 12, 2012, all three of which are hereby incorporated herein by reference in their respective entireties.

Cloud computing platforms may provide many powerful capabilities for performing computing operations. However, taking advantage of these computing capabilities manually may be complex and/or require significant training and/or expertise. Prior techniques for providing cloud computing platforms and services often require customers to understand details and configurations of hardware and software resources to establish and configure the cloud computing platform. Methods and apparatus disclosed herein facilitate the management of virtual machine resources in cloud computing platforms.

A virtual machine is a software computer that, like a physical computer, runs an operating system and applications. An operating system installed on a virtual machine is referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example.

As disclosed in detail herein, methods and apparatus disclosed herein provide for automation of management tasks, such as provisioning multiple virtual machines for a multiple-machine computing system (e.g., a group of servers that inter-operate), linking provisioned virtual machines and tasks to desired systems to execute those virtual machines or tasks, reclaiming cloud computing resources that are no longer in use, lifecycle management of custom resources created by customers, propagating node configuration changes to services residing on cluster nodes, etc. The improvements to cloud management systems (e.g., the vCloud Automation Center (vCAC) from VMware®, the vRealize Automation Cloud Automation Software from VMware®), interfaces, portals, etc. disclosed herein may be utilized individually and/or in any combination. For example, all or a subset of the described improvements may be utilized.

As used herein, availability refers to the level of redundancy required to provide continuous operation expected for the workload domain. As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD)), and power capabilities of a workload domain. As used herein, capacity refers to the aggregate number of resources (e.g., aggregate storage, aggregate CPU, etc.) across all servers associated with a cluster and/or a workload domain. In examples disclosed herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options).

Example Virtualization Environments

Many different types of virtualization environments exist. Three example types of virtualization environment are: full virtualization, paravirtualization, and operating system virtualization.

Full virtualization, as used herein, is a virtualization environment in which hardware resources are managed by a hypervisor to provide virtual hardware resources to a virtual machine. In a full virtualization environment, the virtual machines do not have direct access to the underlying hardware resources. In a typical full virtualization environment, a host operating system with embedded hypervisor (e.g., VMware ESXi®) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical random access memory (RAM) with virtual RAM). Typically, in full virtualization, the virtual machine and the guest operating system have no visibility and/or direct access to the hardware resources of the underlying server. Additionally, in full virtualization, a full guest operating system is typically installed in the virtual machine while a host operating system is installed on the server hardware. Example full virtualization environments include VMware ESX®, Microsoft Hyper-V®, and Kernel Based Virtual Machine (KVM).

Paravirtualization, as used herein, is a virtualization environment in which hardware resources are managed by a hypervisor to provide virtual hardware resources to a virtual machine and guest operating systems are also allowed direct access to some or all of the underlying hardware resources of the server (e.g., without accessing an intermediate virtual hardware resource). In a typical paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

Operating system virtualization is also referred to herein as container virtualization. As used herein, operating system virtualization refers to a system in which processes are isolated in an operating system. In a typical operating system virtualization system, a host operating system is installed on the server hardware. Alternatively, the host operating system may be installed in a virtual machine of a full virtualization environment or a paravirtualization environment. The host operating system of an operating system virtualization system is configured (e.g., utilizing a customized kernel) to provide isolation and resource management for processes that execute within the host operating system (e.g., applications that execute on the host operating system). The isolation of the processes is known as a container. Several containers may share a host operating system. Thus, a process executing within a container is isolated the process from other processes executing on the host operating system. Thus, operating system virtualization provides isolation and resource management capabilities without the resource overhead utilized by a full virtualization environment or a paravirtualization environment. Alternatively, the host operating system may be installed in a virtual machine of a full virtualization environment or a paravirtualization environment. Example operating system virtualization environments include Linux Containers LXC and LXD, Docker™, OpenVZ™, etc.

In some instances, a data center (or pool of linked data centers) may include multiple different virtualization environments. For example, a data center may include hardware resources that are managed by a full virtualization environment, a paravirtualization environment, and an operating system virtualization environment. In such a data center, a workload may be deployed to any of the virtualization environments.

Cloud Management

Prior cloud management systems usually are limited to managing a predefined set of virtual infrastructure resources, such as predefined virtual machines, storage, networks, etc. Furthermore, prior cloud management systems do not provide mechanisms by which cluster configuration changes including addition of a node, removal of a node, promotion/demotion of a node, etc., are automatically propagated to services that are supported on the affected cluster nodes. For example, a cloud service may be distributed across multiple clusters of a node and, in some examples, when a new node is to be added in support of the cloud service, the other nodes of the cluster need to be informed of the addition of the new node to ensure continued proper operation of the service. In the past, when such a cluster configuration change occurred (e.g., a node was added to a cluster), an operation (typically a Java coded operation), such as a "join cluster" operation, was performed to add the node. If the added node was to be configured to support a cloud service (or a non-cloud based service) then additional Java code had to be manually added to the Java code used to perform the "join cluster" operation. Typically, the added code ensures that the newly added node is configured to communicate with and be recognized by a "leading node," as well as all other cluster nodes. The leading node can be, for example, a master node in a database application/service (e.g., vPostgres database, etc.). In addition to manually adding the Java code to the example join cluster operation, the cluster change (e.g., the addition of the node) is communicated to other nodes in the cluster that support the service using for example a copy of a configuration file supplied by the node being added. In some examples, computer code in the form of scripts enable the reconfiguration of the, for example, the leading node and a copy of the reconfiguration file is transmitted from the master/leading node or the newly added node to the other cluster nodes. The other cluster nodes execute the received reconfiguration file which operates to configure the other nodes to recognize and communicate with the newly added node. However, the existing manner in which cluster configuration changes are performed by the nodes of a cluster is separate from the manner in which a service on the cluster is configured. In addition, currently, when a node that supports one or more services is added to a cluster, the newly added node and the other nodes of the cluster that support the service need to be configured to recognize the new node and, in a separate process, the service itself needs to be reconfigured to recognize and access the new node. Thus, two different configuration processes need to be undertaken. Further, at least some of the reconfiguring needed to enable the addition of the node is performed by adding Java code to an existing operation coded in Java. Unfortunately, the coding in Java (in this manner) tends to be rather restrictive, less easily readable, and less easily extendable. Further, in addition to enabling communication between the new node and a leading node, the node change has to then be propagated to other cluster nodes by transmitting scripts to be executed at the other cluster nodes, which further introduces opportunities for error.

Unlike such prior systems, example cloud management systems (e.g., such as the vRealize Automation Cloud Automation Software from VMware®) that are enhanced to automatically propagate node changes to services that are supported on the affected cluster nodes as disclosed herein include node change event servers that reside on every node of a cluster. The node change event servers are configured to listen for a node change event from other nodes of the cluster. When a node experiences an event (e.g., is added, removed, promoted, demoted, etc.), the node experiencing the event sends a message to the other nodes of the cluster. In some examples, the message is an application programming interface call ("API" call). The API call includes information about the event such as, for example, information about the calling node, information identifying the leading node, information identifying replica nodes, etc. Upon receiving such an API call, node change event servers disposed on each of the receiving nodes access corresponding script libraries and identify a folder corresponding to the type (e.g., node added, node removed, node promoted, node demoted, etc.) of API call that was received. The node then executes the scripts contained within the identified folder. The scripts, when executed, configure the services supported by the node executing the scripts as needed to recognize the node event/change.

These and other example methods, apparatus, systems and articles of manufacture (e.g., physical storage media) to implement an automated node configuration system to support services in a cloud computing environment are disclosed in further detail below.

Illustrated Examples

FIG. 1 depicts an example system 100 constructed in accordance with the teachings of this disclosure for managing a cloud computing platform. The example system 100 includes an application director 106 and a cloud manager 138 to manage a cloud computing platform provider 110 as described in more detail below. As described herein, the example system 100 facilitates management of the cloud provider 110 and does not include the cloud provider 110. Alternatively, the system 100 could be included in the cloud provider 110.

The cloud computing platform provider 110 provisions virtual computing resources (e.g., virtual machines, or "VMs," 114) that may be accessed by users of the cloud computing platform 110 (e.g., users associated with an administrator 116 and/or a developer 118) and/or other programs, software, device, etc.

An example application 102 of FIG. 1 includes multiple VMs 114. The example VMs 114 of FIG. 1 provide different functions within the application 102 (e.g., services, portions of the application 102, etc.). One or more of the VMs 114 of the illustrated example are customized by an administrator 116 and/or a developer 118 of the application 102 relative to a stock or out-of-the-box (e.g., commonly available purchased copy) version of the services and/or application components. Additionally, the services executing on the example VMs 114 may have dependencies on other ones of the VMs 114.

As illustrated in FIG. 1, the example cloud computing platform provider 110 may provide multiple deployment environments 112, for example, for development, testing, staging, and/or production of applications. The administrator 116, the developer 118, other programs, and/or other devices may access services from the cloud computing platform provider 110, for example, via REST (Representational State Transfer) APIs (Application Programming Interfaces) and/or via any other client-server communication protocol. Example implementations of a REST API for cloud computing services include a vCloud Administrator Center™ (vCAC) and/or a vRealize Automation™ (vRA) API and a vCloud Director™ API available from VMware, Inc. The example cloud computing platform provider 110 provisions virtual computing resources (e.g., the VMs 114) to provide the deployment environments 112 in which the administrator 116 and/or the developer 118 can deploy multi-tier application(s). One particular example implementation of a deployment environment that may be used to implement the deployment environments 112 of FIG. 1 is vCloud DataCenter cloud computing services available from VMware, Inc.

In some examples disclosed herein, a lighter-weight virtualization is employed by using containers in place of the VMs 114 in the development environment 112. Example containers 114a are software constructs that run on top of a host operating system without the need for a hypervisor or a separate guest operating system. Unlike virtual machines, the containers 114a do not instantiate their own operating systems. Like virtual machines, the containers 114a are logically separate from one another. Numerous containers can run on a single computer, processor system and/or in the same development environment 112. Also like virtual machines, the containers 114a can execute instances of applications or programs (e.g., an example application 102a) separate from application/program instances executed by the other containers in the same development environment 112.

The example application director 106 of FIG. 1, which may be running in one or more VMs, orchestrates deployment of multi-tier applications onto one of the example deployment environments 112. As illustrated in FIG. 1, the example application director 106 includes a topology generator 120, a deployment plan generator 122, and a deployment director 124.

The example topology generator 120 generates a basic blueprint 126 that specifies a logical topology of an application to be deployed. The example basic blueprint 126 generally captures the structure of an application as a collection of application components executing on virtual computing resources. For example, the basic blueprint 126 generated by the example topology generator 120 for an online store application may specify a web application (e.g., in the form of a Java web application archive or "WAR" file including dynamic web pages, static web pages, Java servlets, Java classes, and/or other property, configuration and/or resources files that make up a Java web application) executing on an application server (e.g., Apache Tomcat application server) that uses a database (e.g., MongoDB) as a data store. As used herein, the term "application" generally refers to a logical deployment unit, including one or more application packages and their dependent middleware and/or operating systems. Applications may be distributed across multiple VMs. Thus, in the example described above, the term "application" refers to the entire online store application, including application server and database components, rather than just the web application itself. In some instances, the application may include the underlying hardware and/or virtual computing hardware utilized to implement the components.

The example basic blueprint 126 of FIG. 1 may be assembled from items (e.g., templates) from a catalog 130, which is a listing of available virtual computing resources (e.g., VMs, networking, storage, etc.) that may be provisioned from the cloud computing platform provider 110 and available application components (e.g., software services, scripts, code components, application-specific packages) that may be installed on the provisioned virtual computing resources. The example catalog 130 may be pre-populated and/or customized by an administrator 116 (e.g., IT (Information Technology) or system administrator) that enters in specifications, configurations, properties, and/or other details about items in the catalog 130. Based on the application, the example blueprints 126 may define one or more dependencies between application components to indicate an installation order of the application components during deployment. For example, since a load balancer usually cannot be configured until a web application is up and running, the developer 118 may specify a dependency from an Apache service to an application code package.

The example deployment plan generator 122 of the example application director 106 of FIG. 1 generates a deployment plan 128 based on the basic blueprint 126 that includes deployment settings for the basic blueprint 126 (e.g., virtual computing resources' cluster size, CPU, memory, networks, etc.) and an execution plan of tasks having a specified order in which virtual computing resources are provisioned and application components are installed, configured, and started. The example deployment plan 128 of FIG. 1 provides an IT administrator with a process-oriented view of the basic blueprint 126 that indicates discrete actions to be performed to deploy the application. Different deployment plans 128 may be generated from a single basic blueprint 126 to test prototypes (e.g., new application versions), to scale up and/or scale down deployments, and/or to deploy the application to different deployment environments 112 (e.g., testing, staging, production). The deployment plan 128 is separated and distributed as local deployment plans having a series of tasks to be executed by the VMs 114 provisioned from the deployment environment 112. Each VM 114 coordinates execution of each task with a centralized deployment module (e.g., the deployment director 124) to ensure that tasks are executed in an order that complies with dependencies specified in the application blueprint 126.

The example deployment director 124 of FIG. 1 executes the deployment plan 128 by communicating with the cloud computing platform provider 110 via a cloud interface 132 to provision and configure the VMs 114 in the deployment environment 112. The example cloud interface 132 of FIG. 1 provides a communication abstraction layer by which the application director 106 may communicate with a heterogeneous mixture of cloud provider 110 and deployment environments 112. The deployment director 124 provides each VM 114 with a series of tasks specific to the receiving VM 114 (herein referred to as a "local deployment plan"). Tasks are executed by the VMs 114 to install, configure, and/or start one or more application components. For example, a task may be a script that, when executed by a VM 114, causes the VM 114 to retrieve and install particular software packages from a central package repository 134. The example deployment director 124 coordinates with the VMs 114 to execute the tasks in an order that observes installation dependencies between VMs 114 according to the deployment plan 128. After the application has been deployed, the application director 106 may be utilized to monitor and/or modify (e.g., scale) the deployment.

The example cloud manager 138 of FIG. 1 interacts with the components of the system 100 (e.g., the application director 106 and the cloud provider 110) to facilitate the management of the resources of the cloud provider 110. The example cloud manager 138 includes a blueprint manager 140 to facilitate the creation and management of multi-machine blueprints and a resource manager 144 to reclaim unused cloud resources. The cloud manager 138 may additionally include other components for managing a cloud environment.

The example blueprint manager 140 of the illustrated example manages the creation of multi-machine blueprints that define the attributes of multiple virtual machines as a single group that can be provisioned, deployed, managed, etc. as a single unit. For example, a multi-machine blueprint may include definitions for multiple basic blueprints that make up a service (e.g., an e-commerce provider that includes web servers, application servers, and database servers). A basic blueprint is a definition of policies (e.g., hardware policies, security policies, network policies, etc.) for a single machine (e.g., a single virtual machine such as a web server virtual machine and/or container). Accordingly, the blueprint manager 140 facilitates more efficient management of multiple virtual machines and/or containers than manually managing (e.g., deploying) basic blueprints individually. Example management of multi-machine blueprints is described in further detail in conjunction with FIG. 2.

The example blueprint manager 140 of FIG. 1 additionally annotates basic blueprints and/or multi-machine blueprints to control how workflows associated with the basic blueprints and/or multi-machine blueprints are executed. As used herein, a workflow is a series of actions and decisions to be executed in a virtual computing platform. The example system 100 includes first and second distributed execution manager(s) (DEM(s)) 146A and 146B to execute workflows. According to the illustrated example, the first DEM 146A includes a first set of characteristics and is physically located at a first location 148A. The second DEM 146B includes a second set of characteristics and is physically located at a second location 148B. The location and characteristics of a DEM may make that DEM more suitable for performing certain workflows. For example, a DEM may include hardware particularly suited for performance of certain tasks (e.g., high-end calculations), may be located in a desired area (e.g., for compliance with local laws that require certain operations to be physically performed within a country's boundaries), may specify a location or distance to other DEMS for selecting a nearby DEM (e.g., for reducing data transmission latency), etc. Thus, the example blueprint manager 140 annotates basic blueprints and/or multi-machine blueprints with capabilities that can be performed by a DEM that is labeled with the same or similar capabilities.

The resource manager 144 of the illustrated example facilitates recovery of cloud computing resources of the cloud provider 110 that are no longer being actively utilized. Automated reclamation may include identification, verification and/or reclamation of unused, underutilized, etc., resources to improve the efficiency of the running cloud infrastructure.

Figure 2:
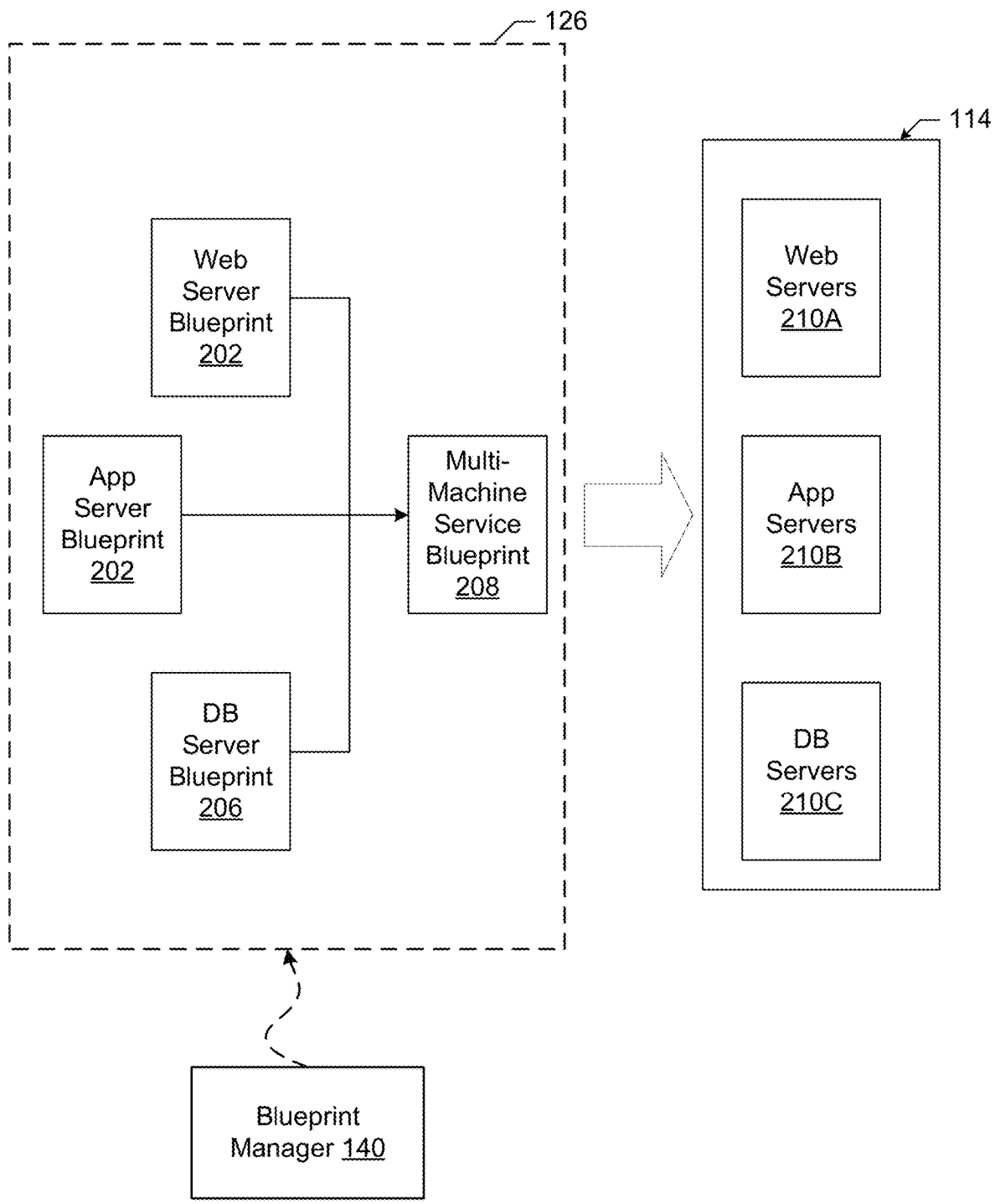
FIG. 2 illustrates an example generation of a multi-machine blueprint by the example blueprint manager of FIG. 1.

FIG. 2 illustrates an example implementation of the blueprint 126 as a multi-machine blueprint generated by the example blueprint manager 140 of FIG. 1. In the illustrated example of FIG. 2, three example basic blueprints (a web server blueprint 202, an application server blueprint 204, and a database (DB) server blueprint 206) have been created (e.g., by the topology generator 120). For example, the web server blueprint 202, the application server blueprint 204, and the database server blueprint 206 may define the components of an e-commerce online store.

The example blueprint manager 140 provides a user interface for a user of the blueprint manager 140 (e.g., the administrator 116, the developer 118, etc.) to specify blueprints (e.g., basic blueprints and/or multi-machine blueprints) to be assigned to an instance of a multi-machine blueprint 208. For example, the user interface may include a list of previously generated basic blueprints (e.g., the web server blueprint 202, the application server blueprint 204, the database server blueprint 206, etc.) to allow selection of desired blueprints. The blueprint manager 140 combines the selected blueprints into the definition of the multi-machine blueprint 208 and stores information about the blueprints in a multi-machine blueprint record defining the multi-machine blueprint 208. The blueprint manager 140 may additionally include a user interface to specify other characteristics corresponding to the multi-machine blueprint 208. For example, a creator of the multi-machine blueprint 208 may specify a minimum number and a maximum number of each blueprint component of the multi-machine blueprint 208 that may be provisioned during provisioning of the multi-machine blueprint 208.

Accordingly, any number of virtual machines (e.g., the virtual machines associated with the blueprints in the multi-machine blueprint 208) and/or containers may be managed collectively. For example, the multiple virtual machines corresponding to the multi-machine blueprint 208 may be provisioned based on an instruction to provision the multi-machine blueprint 208, may be power cycled by an instruction, may be shut down by an instruction, may be booted by an instruction, etc. As illustrated in FIG. 2, an instruction to provision the multi-machine blueprint 208 may result in the provisioning of a multi-machine service formed from one or more VMs 114 that includes virtualized web server(s) 210A, virtualized application server(s) 210B, and virtualized database server(s) 210C. The number of virtual machines and/or containers provisioned for each blueprint may be specified during the provisioning of the multi-machine blueprint 208 (e.g., subject to the limits specified during creation or management of the multi-machine blueprint 208).

The multi-machine blueprint 208 maintains the reference to the basic blueprints 202, 204, 206. Accordingly, changes made to the blueprints (e.g., by a manager of the blueprints different than the manager of the multi-machine blueprint 208) may be incorporated into future provisioning of the multi-machine blueprint 208. Accordingly, an administrator maintaining the source blueprints (e.g., an administrator charged with managing the web server blueprint 202) may change or update the source blueprint and the changes may be automatically propagated to the machines provisioned from the multi-machine blueprint 208. For example, if an operating system update is applied to a disk image referenced by the web server blueprint 202 (e.g., a disk image embodying the primary disk of the web server blueprint 202), the updated disk image is utilized when deploying the multi-machine blueprint. Additionally, the blueprints may specify that the machines 210A, 210B, 210C of the multi-machine service 210 provisioned from the multi-machine blueprint 208 operate in different environments. For example, some components may be physical machines, some may be on-premises virtual machines, and some may be virtual machines at a cloud service.

Several multi-machine blueprints may be generated to provide one or more varied or customized services. For example, if virtual machines deployed in the various States of the United States require different settings, a multi-machine blueprint could be generated for each state. The multi-machine blueprints could reference the same build profile and/or disk image, but may include different settings specific to each state. For example, the deployment workflow may include an operation to set a locality setting of an operating system to identify a particular state in which a resource is physically located. Thus, a single disk image may be utilized for multiple multi-machine blueprints reducing the amount of storage space for storing disk images compared with storing a disk image for each customized setting.

Figure 3:
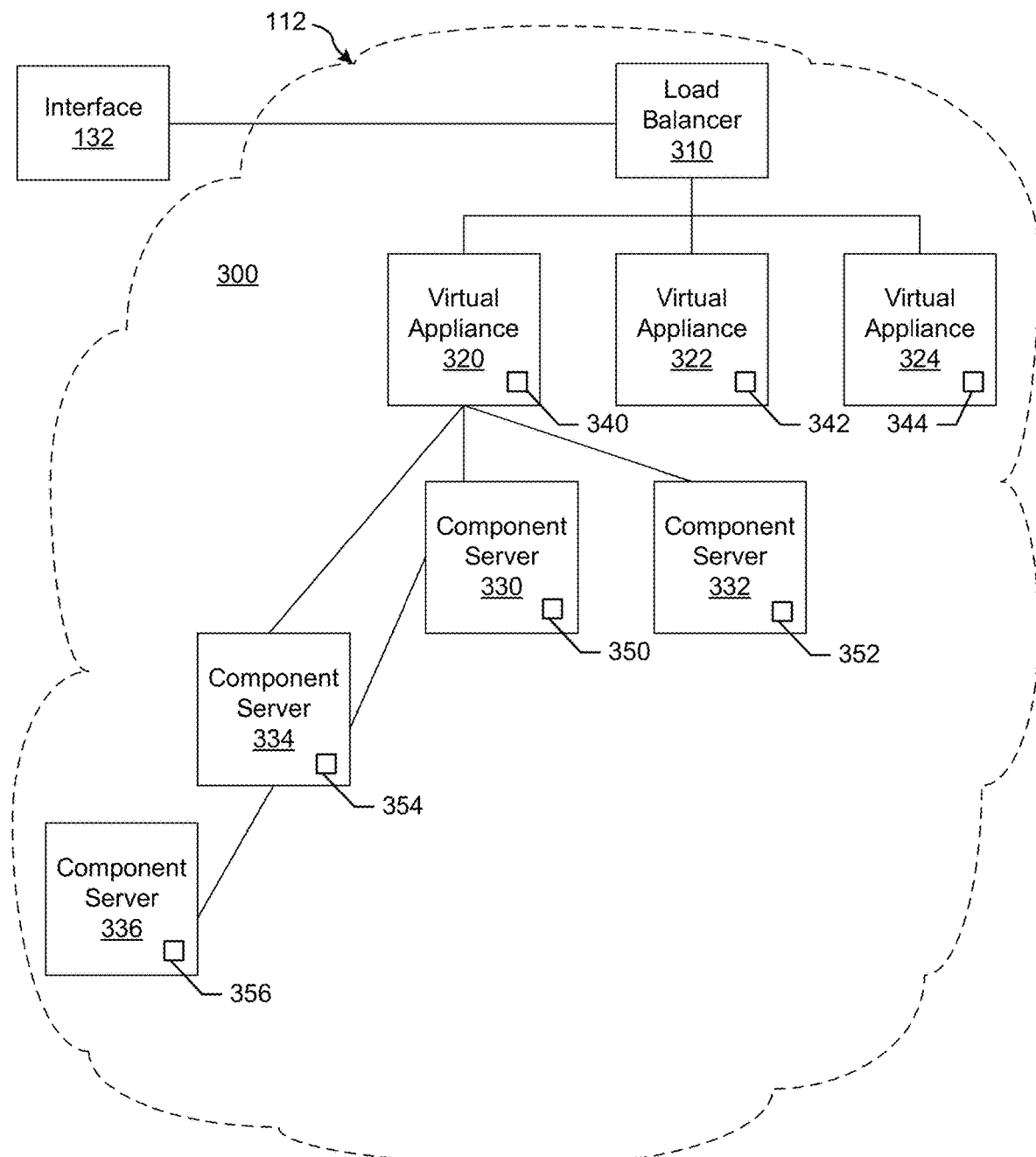
FIG. 3 illustrates an example installation of deployed virtual machines and associated servers acting as hosts for deployment of component servers for a customer.

FIG. 3 illustrates an example installation of deployed appliances or virtual appliances (vAs) (e.g., VMs 114 and/or containers 114a) and associated virtualized servers acting as hosts for deployment of component servers (e.g., Web server, application server, database server, etc.) for a customer. The vAs can be deployed as an automation tool, for example, used to deliver VMs and associated applications for on-premises automation and/or handling of external cloud resources (e.g., Microsoft Azure™, Amazon Web Services™, etc.).

As shown in the example of FIG. 3, an installation 300 includes a load balancer (LB) 310 to assign tasks and/or manage access among a plurality of vAs 320, 322, 324. Each vA 320-324 is a deployed VM 114 and/or container 114a. In this example, the vA 320 communicates with a plurality of component or host servers 330, 332, 334, 336 which store components for execution by users (e.g., Web server 210A with Web components, App server 210B with application components, DB server 210C with database components, etc.). As shown in the example of FIG. 3, component servers 334, 336 can stem from component server 330 rather than (or in addition to) directly from the virtual appliance 320, although the vA 320 can still communicate with such servers 334, 336. The LB 310 enables the multiple vAs 320-324 and multiple servers 330-336 to appear as one device to a user. Access to functionality can then be distributed among appliances 320-324 by the LB 310 and among servers 330-336 by the respective appliance 320, for example. The LB 310 can use least response time, round-robin, and/or other method to balance traffic to vAs 320-324 and servers 330-336, for example.

In the example installation 300, each vA 320, 322, 324 includes a management endpoint 340, 342, 344. Each component server 330, 332, 334, 336 includes a management agent 350, 352, 354, 356. The management agents 350-356 can communicate with their respective endpoint 340 to facilitate transfer of data, execution of tasks, etc., for example.

In certain examples, the management agents 350-356 synchronize component servers 330-336 with the vA 320-234 and facilitate host access and associated services (e.g., hostd, ntpd, sfcbd, slpd, wsman, vobd, etc.). The management agents 350-356 can communicate with their respective endpoint 340 to facilitate transfer of data, execution of tasks, etc., for example. The relationship between management endpoint 340, 342, 344 and associated management agents 350, 352, 354, 356 can be used to deploy and install software on multiple component machines 330, 332, 334, 336.

In certain examples, a graphical user interface associated with a front end of the load balancer 310 guides a customer through one or more questions to determine system requirements for the installation 300. Once the customer has completed the questionnaire and provided firewall access to install the agents 350-356, the agents 350-356 communicate with the endpoint 340 without customer involvement. Thus, for example, if a new employee needs a Microsoft Windows® machine, a manager selects an option (e.g., clicks a button, etc.) via the graphical user interface to install a VM 114 and/or container 114a that is managed through the installation 300. To the user, he or she is working on a single machine, but behind the scenes, the virtual appliance (vA) 320 is accessing different servers 330-336 depending upon what functionality is to be executed.

In certain examples, agents 350-356 are deployed in a same data center as the endpoint 340 to which the agents 350-356 are associated. The deployment can include a plurality of agent servers 330-336 distributed worldwide, and the deployment can be scalable to accommodate additional server(s) with agent(s) to increase throughput and concurrency, for example.

Figure 4:
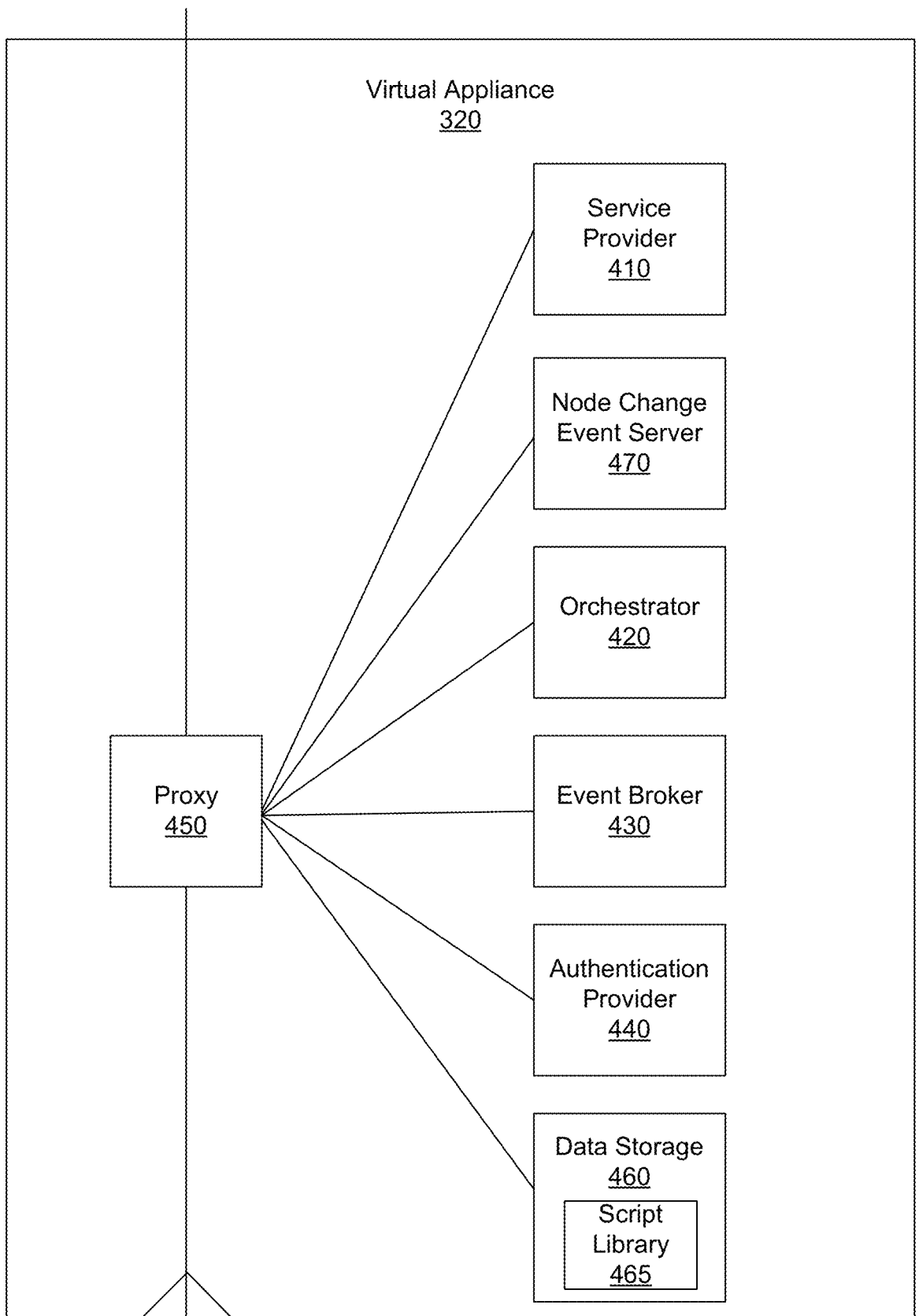
FIG. 4 illustrates an example implementation of a virtual appliance having an example node change event server to propagate node configuration changes to services in accordance with the teachings of this disclosure.

FIG. 4 illustrates an example implementation of the vA 320. In the example of FIG. 4, the vA 320 includes an example service provisioner 410, an example orchestrator 420, an example event broker 430, an example authentication provider 440, an example internal reverse proxy 450, an example data storage server 460 having an example script library 465 and an example node change event server (also referred to as an "endpoint server") 470. The components 410, 420, 430, 440, 450, 460, 465, 470 of the vA 320 may be implemented by one or more of the VMs 114. The example service provisioner 410 provides services to provision interfaces (e.g., Web interface, application interface, etc.) for the vA 320. The example orchestrator (e.g., vCO) 420 is an embedded or internal orchestrator that can leverage a provisioning manager, such as the application director 106 and/or the cloud manager 138, to provision VM services but is embedded in the vA 320. For example, the vCO 420 can be used to invoke a blueprint to provision a manager for services.

Example services can include catalog services, identity services, component registry services, event broker services, IaaS, XaaS ("Anything-as-a-Service"), etc. Catalog services provide a user interface via which a user can request provisioning of different preset environments (e.g., a VM including an operating system and software and some customization, etc.), for example. Identity services facilitate authentication and authorization of users and assigned roles, for example. The component registry maintains information corresponding to installed and deployed services (e.g., uniform resource locators for services installed in a VM/vA, etc.), for example. The event broker 430 provides a messaging broker for event-based communication, for example. The IaaS provisions one or more VMs and/or containers for a customer via the vA 320. The XaaS can extend the provisioning to also request, approve, provision, operate, and decommission any type of catalog items (e.g., storage, applications, accounts, and anything else that the catalog provides as a service).

The example event broker 430 provides a mechanism to handle tasks which are transferred between services with the orchestrator 420. The example authentication provider 440 (e.g., VMware Horizon™ services, etc.) authenticates access to services and data, for example.

The components of the vA 320 access each other through REST API calls behind the internal reverse proxy 450 (e.g., a high availability (HA) proxy HAProxy which provides a high availability load balancer and proxy for Transmission Control Protocol (TCP)- and Hypertext Transfer Protocol (HTTP)-based application requests. In this example, the proxy 450 forwards communication traffic from within the vA 320 and/or between vAs 320, 322, 324 of FIG. 3 to the appropriate component(s) of the vA 320. In certain examples, services access the local host/proxy 450 on a particular port, and the call is masked by the proxy 450 and forwarded to the particular component of the vA 320. Since the call is masked by the proxy 450, components can be adjusted within the vA 320 without impacting outside users.

As described above, the example vA 320 of FIG. 4 further includes the example node change event server 470 that, in combination with the example script library 465 installed in (associated with) the example data storage server 460, implement an example automated method of propagating a node event/change to the nodes of a cluster and reconfiguring services supported on the cluster nodes in accordance with the teachings of this disclosure. The example node change event server implemented by the vA 320 allows a node event/change to be propagated from a node of a cluster to other nodes of the same cluster and further causes the other nodes of the same cluster to reconfigure the services on the clusters that are affected by the node event/change as needed to accommodate the node event/change.

Figure 5:
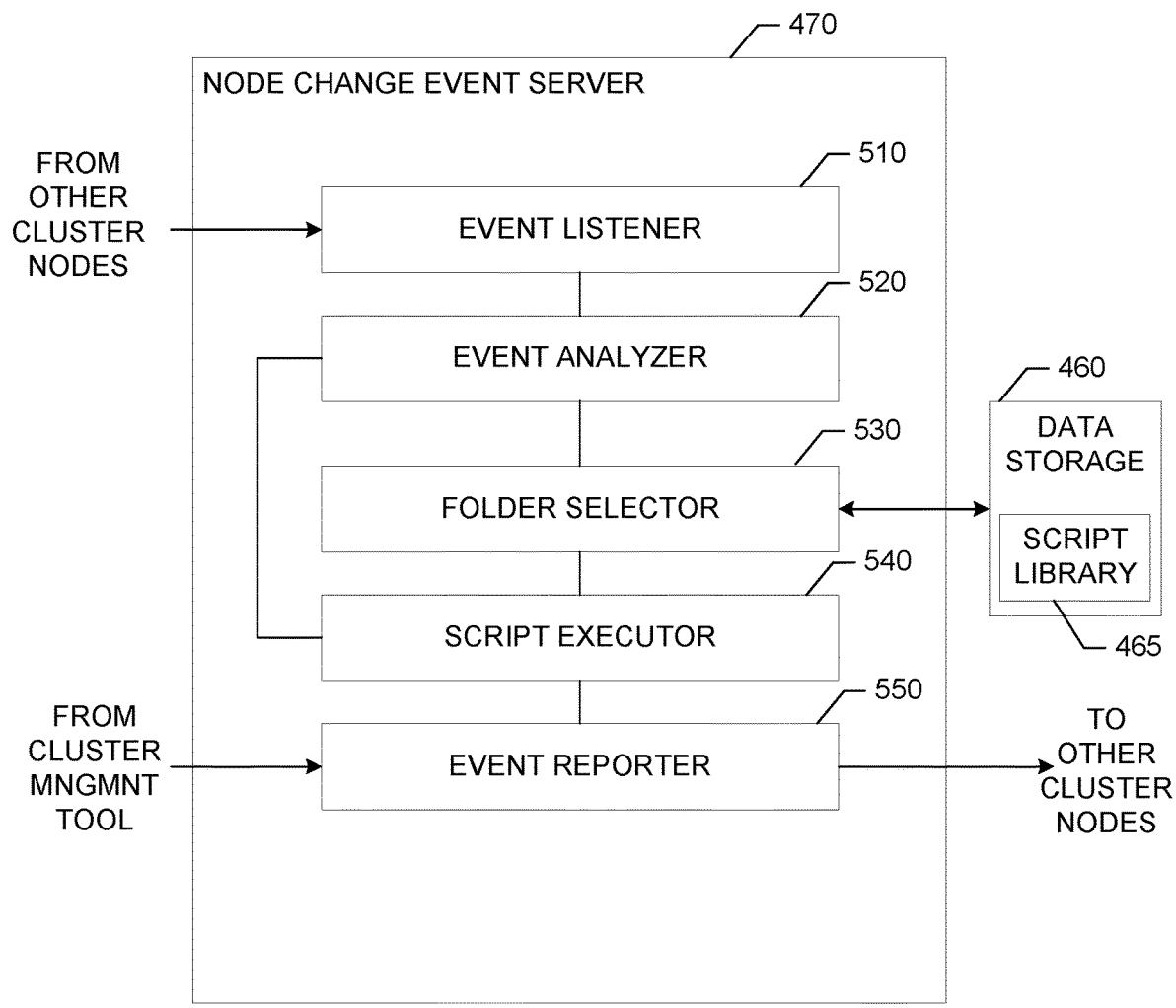
FIG. 5 illustrates an example node change event server of the virtual appliance of FIG. 4.

FIG. 5 illustrates an example implementation of the node change event server 470. In the illustrated example, the node change event server 470 includes an example event listener 510, an example event analyzer 520, an example folder selector 530, an example script executor 540, and an example event reporter 550. As described, in some examples, the example node change event server 470 is installed in each of the nodes (e.g., virtual appliance) of an example cluster of nodes. When a node change event occurs (e.g., a node is added to the cluster, a node is removed from the cluster, a node is promoted to be a leading node, a node is demoted from being a leading node, and/or any other cluster-related operation) as initiated/triggered by, for example, a user/administrator operating a cluster management tool such as the cloud manager 138, the node subject to the node change event generates a node change event message having event information about the node change event. In some examples, the cloud manager 138 causes the node subject to the node change event to generate the node change event message upon experiencing the node change event. In some examples, any other tool associated with affecting node deployment changes can be configured to cause the node subject to the node change event to generate the node change event message. The fact that the node change event message is generated by an entity residing on the node experiencing the node change event (and not the identity of the entity) is important. Accordingly, any entity/tool/server residing on the node experiencing the node change event can be configured to generate the node change event message. In some examples, the event information contained in the node change event message includes information about the cluster state and the node change event such as an example first node identifier that identifies the lead node of the cluster, example second node identifiers that identify any replica nodes included in the cluster, an example third node identifier that identifies the node that triggered the node event (e.g., the added node, the removed node, the promoted node, etc.), an event identifier that identifies the event (e.g., node added, node removed, node promoted, etc.). The node change event message can be implemented as a REST API that is transmitted to all of the other nodes included in the same cluster as the node experiencing the node change event. In some examples, upon deployment of the node, the node experiencing the node change event has access to information identifying all other nodes included in the cluster and uses the information to communicate with the node change event servers 470 disposed on the cluster nodes. In some examples, the node change event server 470 resides on a lighttpd server and is implemented using the Python™ programming language.

In the illustrated example of FIG. 5, the example event listener 510 of the example node change event server 470 is configured to listen to communications received at the example corresponding node (e.g., the node on which the node change event server 470 is disposed). In some such examples, upon detecting an event message, the event listener 510 supplies the detected event message to the example event analyzer 520. The example event analyzer 520 processes the event information contained in the event message to determine the type of event that occurred and to identify any node identifiers included in the event information. In addition, the example event analyzer 520 supplies information identifying the type of event and further identifying the relevant node identifiers included in the event information to the example folder selector 530 of the node change event server 470 and to the example script executor 540. The folder selector 530 responds by accessing the example script library 465 installed in the example data storage 460 and selecting one of a set of event script folders stored in the script library 465. In some examples, the script library 465 includes an event script folder corresponding to each possible type of event. Accordingly, there is a "node added" event script folder, a "node removed" event script folder, a "node promoted" event script folder, etc. Each event script folder contains a set of event scripts and the event scripts contained in each event script folder each correspond to a different service supported by the node on which the node change event server 470 is installed. For example, an example "node added" event script folder stored on a first node that supports an example Service A, an example Service B, and an example Service C will include at least a first "node added" event script corresponding to the Service A, a second "node added" event script corresponding to the Service B and a third "node added" event script corresponding to the Service C. Further, each of the "node added" event scripts corresponding to each of the Services A, B and C contains a script program (also referred to as a "script") that, when executed, causes a corresponding one of the Services A, B, or C to be reconfigured as needed to accommodate the added node. Likewise, each of the "node removed" event scripts corresponding to each of the Services A, B and C contains a script program that, when executed, causes a corresponding one of the Services A, B, or C to be reconfigured as needed to accommodate the removed node. Additionally, each of the "node promoted" event scripts corresponding to each of the Services A, B and C contains a script program that, when executed, causes a corresponding one of the Services A, B, or C to be reconfigured as needed to accommodate the node promotion, and so on. By way of further example, an example "node added" event script folder stored on a second node that supports an example Service D, an example Service E will include at least a first "node added" event script corresponding to the Service D, and second "node added" event script corresponding to the Service E. Further, each of the "node added" event scripts corresponding to each of the Services D and E contains a script program that, when executed, causes a corresponding one of the Services D, or E to be reconfigured as needed to accommodate the added node. Likewise, each of the "node removed" event scripts corresponding to each of the Services D and E contains a script program that, when executed, causes a corresponding one of the Services D or E to be reconfigured as needed to accommodate the removed node. Additionally, each of the "node promoted" event scripts corresponding to each of the Services D and E contains a script program that, when executed, causes a corresponding one of the Services D, or E to be reconfigured as needed to accommodate the node promotion, and so on. In some examples, the script programs are implemented using a Unix shell such as, for example, bash.

As used herein, when a node is described as "supporting" a service, it is to be understood that the node includes components that, together with components operating on other nodes, provides the service. Examples services that may require reconfiguration in the event of a node change event include messaging services such as RabbitMQ™, searching tools such as Elasticsearch, database tools including database tools that populate an active database and a standby database for backup purposes, database services such as vPostgres, etc. By way of example, when vPostgres service is operating on a cluster of nodes and a new node is added to the cluster, an HAProxy server that performs load balancing among the nodes of the cluster requires reconfiguration so that the HAProxy server can perform load balancing operations that include the new node. In some examples, when a service supported on a node is reconfigured to support a node change event (such as a "node added" event) using the techniques disclosed herein, the script executed in connection with the node change event can cause the service to be temporarily shut down, can cause a line of code associated with the service to be modified to indicate the presence of the new node, for example, and thereafter, the script can cause the service to be restarted.

In the illustrated of FIG. 5, upon selecting the appropriate one of the event script folders from the example script library 465, the example folder selector 530 of the example node change event server 470, supplies the selected event script folder to the example script executor 540. The example script executor 540 executes the event scripts contained in the event script folder and uses the event information supplied by the event analyzer 520 as needed during the execution of the event scripts. For example, one or more of the event scripts may require input information such as one or more of the first, second, and/or third node identifiers or any other information included in the event information. As described above, the event information is extracted from the event message by the event analyzer 520 and supplied by the event analyzer 520 to the script executor 540 for use in executing the event scripts. In some examples, the event scripts cause a set of tasks to be performed relative to a corresponding one of the services (e.g., Service A, Service B, Service C, Service D, Service E, etc.). In some examples, the set of tasks include temporarily shutting down the corresponding service, reconfiguring the corresponding service, restarted the corresponding service, etc.

In the illustrated of FIG. 5, after executing the scripts, the example script executor 540 transmits an example event reporting message to the example event reporter 550 for transmission to the node change event server 470 of the node that triggered the node change event (e.g., the node that was added, the node to be removed, the node that was promoted, etc.). The event reporting message can indicate that one or more of the event scripts were successfully executed, can indicate that one or more of the scripts were not successfully executed, can indicate the Services affected by the node change event, etc.

An example message sequence diagram 600 that illustrates example interactions between the example nodes (e.g., Node 1 601a, Node 2 601b and Node 3 601c) of an example cluster 602 to propagate a node event/change throughout the cluster 602. In the illustrated example, each of the Node 1 601a, the Node 2 601b and the Node 3 601c is implemented using an example virtual appliance, such as the example virtual appliance 320 (see FIG. 4), and includes a corresponding example node change event server 470a, 470b, 470c. The example message sequence diagram 600 of FIG. 6 begins with the example Node 1 601a experiencing a node change event and, in response, generating and transmitting an "node added" event message 604a/604b indicating that the Node 1 601a is being added to the node cluster 602. In some examples, the Node 1 601a is programmed and/or configured to transmit the "node added" event message in response to a signal received from a cluster management tool which can be implemented using, for example, the cloud manager 138. In some examples, the "node added" event message is implemented as a REST API call. In some examples, a first "node added" event message 604a is transmitted to the Node 2 601b and a second "node added" event message 604b is transmitted to the Node 3 601c. In some examples, the first and second "node added" event messages 604a, 604b are transmitted at the same time. In some examples, a single "node added" event message 604 is broadcast to the Node 2 601b and the Node 3 601c.

In response to the first "node added" event message 604a, the event listener 510, event analyzer 520, folder selector 530 and the script executor 540 of the node change event server 470b (installed in the Node 2 601b) operate in the manner described above to select a script folder corresponding to the "node added" event message and to execute the script programs contained therein 606. Thereafter, the event reporter 550 of the node change event server 470b generates and transmits a message to the first cluster node indicating that the scripts were executed (successfully or unsuccessfully) 608. As described above, the execution of the scripts causes corresponding services supported by the second Node 601b to be reconfigured to recognize and communicate with the Node 1 601a.

Figure 6:
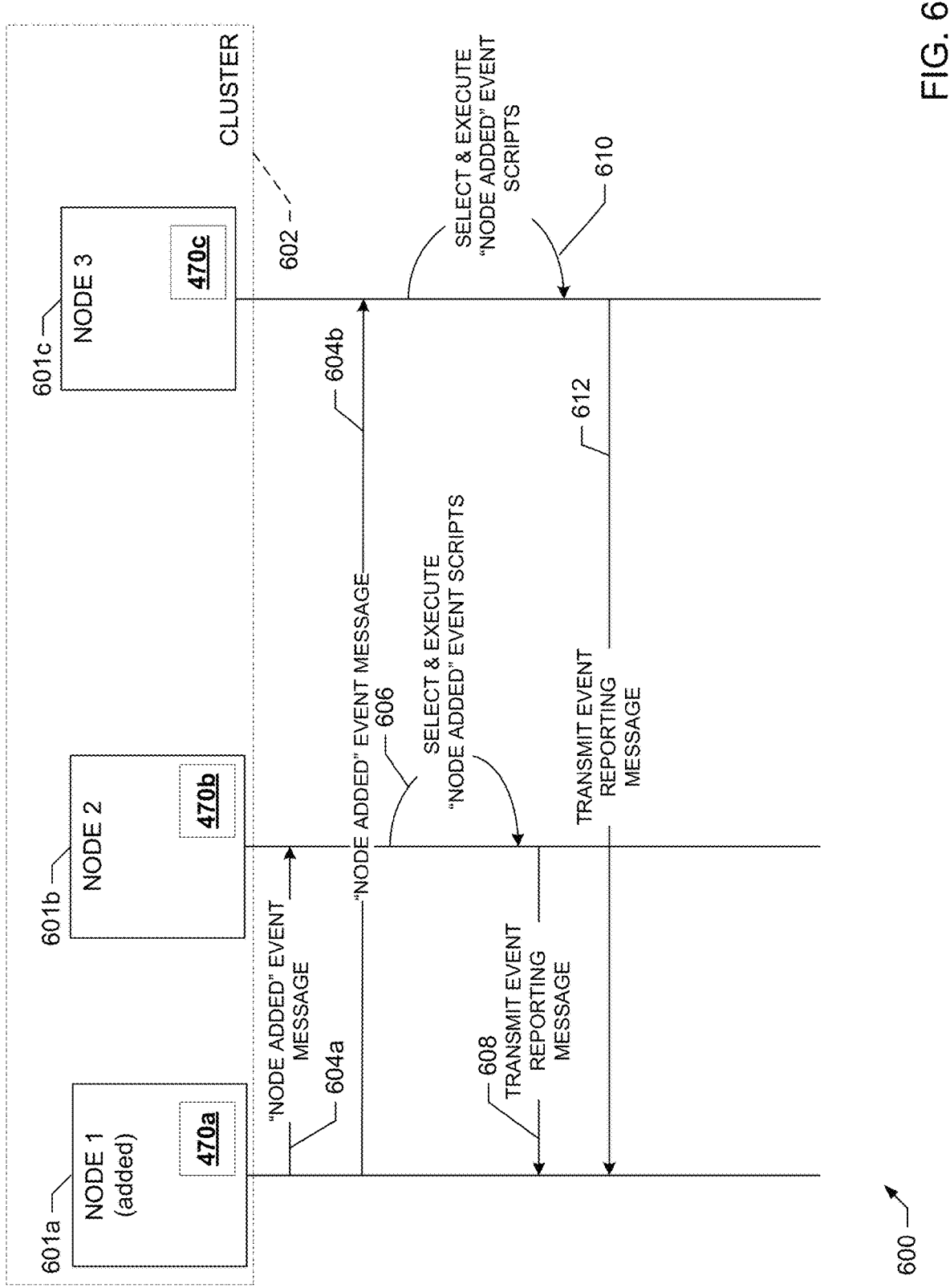
FIG. 6 is a first message sequence diagram illustrating first example messages exchanged by example nodes implemented using the example virtual appliance of FIG. 4 to propagate node configuration changes to services in accordance with the teachings of this disclosure.

In response to the first "node added" event message 604b, the event listener 510, event analyzer 520, folder selector 530 and the script executor 540 of the node change event server 470c (installed in the Node 3 601c) operate in the manner described above to select a script folder corresponding to the "node added" event message and to execute the script programs contained therein 610. Thereafter, the event reporter 550 of the node change event server 470c generates and transmits a message to the first cluster node indicating that the scripts were executed (successfully or unsuccessfully) 612. As described above, the execution of the scripts causes corresponding services supported by the third Node 601c to be reconfigured to recognize and communicate with the Node 1 601a. The example message sequence diagram 600 then ends. Although the selection and execution of "node added" event scripts by the Node 2 601b is illustrated in FIG. 6 as occurring before the selection and execution of "node added" event scripts by the Node 3 601c, these operations need not occur in any particular order relative to each other. Likewise, the transmission of the event reporting message 608 by the Node 2 601b need not occur in any particular order relative to the transmission of the event reporting message 612 by the Node 3 601c. Further, as described above, the scripts programs executed at the Node 2 601b and the Node 3 601c will depend on the services supported by the respective nodes.

Based on the foregoing description, the example methods, systems and apparatus implemented by the example vA 320 (see FIG. 4) provides for the automatic propagation of node change events to all nodes of a cluster and further provides for reconfiguration of services affected by the node change events. Thus, instead of having to manually add computer programming code to notify cluster nodes of a node change event and then manually reconfigure services supported on the cluster nodes to acknowledge the node change event, the methods, systems, and apparatus disclosed herein can be used to automatically notify each node when a node change event has occurred and to automatically trigger the execution of an appropriate set of scripts corresponding to each service on each node to reconfigure the services as needed to accommodate the node change event.

While an example manner of implementing a node propagation and per-service reconfiguration tool service in a cloud computing environment is illustrated in FIGS. 1-6, one or more of the elements, processes and/or devices illustrated in FIGS. 1-6 may be combined, divided, re-arranged, omitted, eliminated and/or implemented in any other way. Further, the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, example service provider 410, example orchestrator 420, example event broker 430, example authentication provider 440, example internal reverse proxy 450, example data storage (e.g., database server) 460, example script library 465, example node change event servers 470, 470a, 470b, 470c, example event listener 510, example event analyzer 520, example folder selector 530, example script executor 540, example event reporter 550, example Node 1 601a, example Node 2 601b, example Node 3 601c, example cluster 602, and/or, more generally, the example systems 100 and/or 300 of FIGS. 1-6 can be implemented by hardware, software, firmware and/or any combination of hardware, software and/or firmware. Thus, for example, any of the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, example service provider 410, example orchestrator 420, example event broker 430, example authentication provider 440, example internal reverse proxy 450, example data storage (e.g., database server) 460, example script library 465, example node change event servers 470, 470a, 470b, 470c, example event listener 510, example event analyzer 520, example folder selector 530, example script executor 540, example event reporter 550, example Node 1 601a, example Node 2 601b, example Node 3 601c, example cluster 602 and/or, more generally, the example systems 100 and/or 300 of FIGS. 1-6 can be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, example service provider 410, example orchestrator 420, example event broker 430, example authentication provider 440, example internal reverse proxy 450, example data storage (e.g., database server) 460, example script library 465, example node change event servers 470, 470a, 470b, 470c, example event listener 510, example event analyzer 520, example folder selector 530, example script executor 540, example event reporter 550, example Node 1 601a, example Node 2 601b, example Node 3 601c, example cluster 602, and/or, more generally, the example systems 100 and/or 300 of FIGS. 1-6 can be implemented by hardware, software, firmware and/or any combination of hardware, software and/or firmware. Thus, for example, any of the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, example service provider 410, example orchestrator 420, example event broker 430, example authentication provider 440, example internal reverse proxy 450, example data storage (e.g., database server) 460, example script library 465, example node change event servers 470, 470a, 470b, 470c, example event listener 510, example event analyzer 520, example folder selector 530, example script executor 540, example event reporter 550, example Node 1 601a, example Node 2 601b, example Node 3 601c, example cluster 602, and/or, more generally, the example systems 100 and/or 300 of FIGS. 1-6 is/are hereby expressly defined to include a tangible computer readable storage device or storage disk such as a memory, a digital versatile disk (DVD), a compact disk (CD), a Blu-ray disk, etc. storing the software and/or firmware. Further still, the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, example service provider 410, example orchestrator 420, example event broker 430, example authentication provider 440, example internal reverse proxy 450, example data storage (e.g., database server) 460, example script library 465, example node change event servers 470, 470a, 470b, 470c, example event listener 510, example event analyzer 520, example folder selector 530, example script executor 540, example event reporter 550, example Node 1 601a, example Node 2 601b, example Node 3 601c, example cluster 602, and/or, more generally, the example systems 100 and/or 300 of FIGS. 1-5 can be implemented by hardware, software, firmware and/or any combination of hardware, software and/or firmware. Thus, for example, any of the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, example service provider 410, example orchestrator 420, example event broker 430, example authentication provider 440, example internal reverse proxy 450, example data storage (e.g., database server) 460, example script library 465, example node change event servers 470, 470a, 470b, 470c, example event listener 510, example event analyzer 520, example folder selector 530, example script executor 540, example event reporter 550, example Node 1 601a, example Node 2 601b, example Node 3 601c, example cluster 602, and/or, more generally, the example systems 100 and/or 300 of FIGS. 1-6 may include one or more elements, processes and/or devices in addition to, or instead of, those illustrated in FIGS. 1-6, and/or may include more than one of any or all of the illustrated elements, processes and devices.

Figure 7:
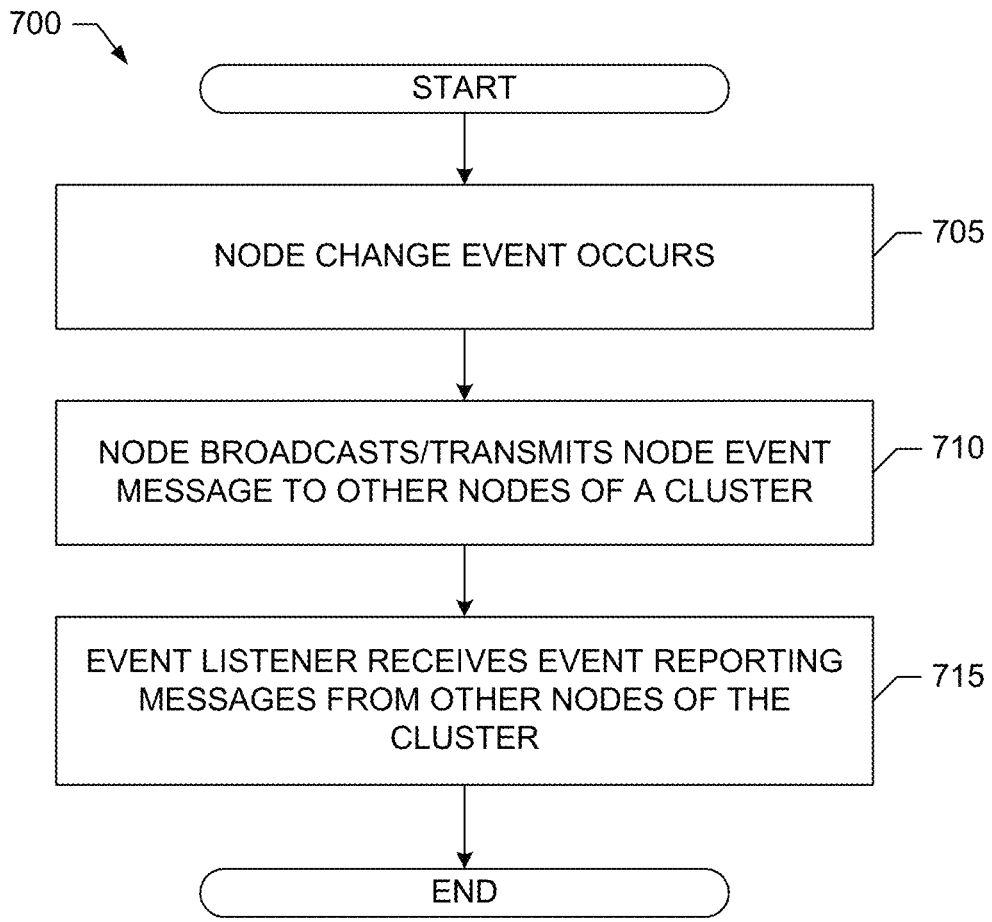
FIG. 7 is a flowchart representative of example computer readable instructions that may be executed to implement an example node change event server of the example virtual appliance of FIG. 4.
Figure 8:
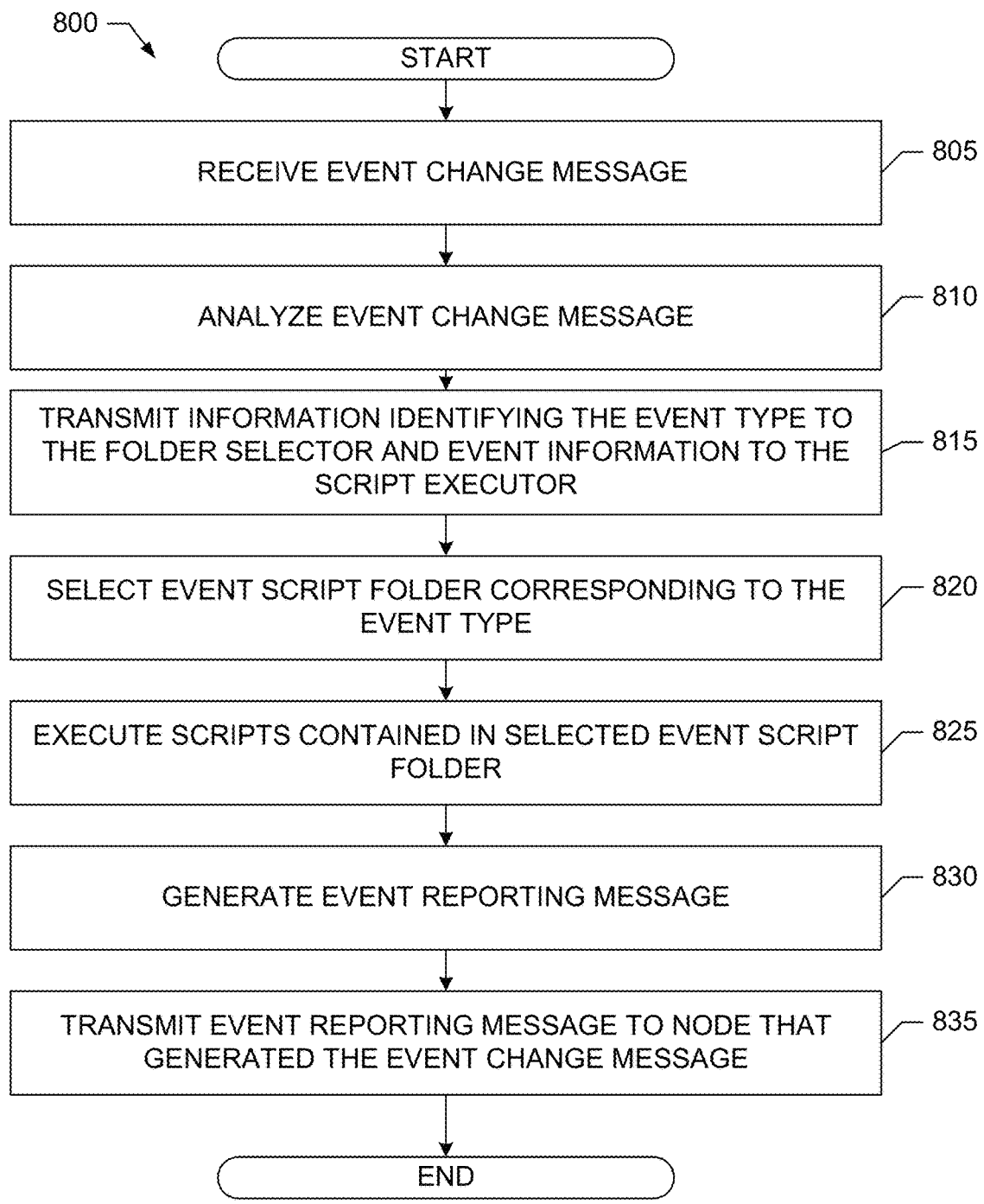
FIG. 8 is a flowchart representative of example computer readable instructions that may be executed to implement an example node change event server of the example virtual appliance of FIG. 4.

Flowcharts representative of example machine readable instructions that may be executed to implement the example virtual appliances 320, example service provider 410, example orchestrator 420, example event broker 430, example authentication provider 440, example internal reverse proxy 450, example data storage server 460, example script library 465, example node change event servers 470, 470a, 470b, 470c, example event listener 510, example event analyzer 520, example folder selector 530, example script executor 540, example event reporter 550, example Node 1 601a, example Node 2 601b, example Node 3 601c, example cluster 602, and/or to deploy and manage the example application director 106, example cloud provider 110, example cloud manager 138, example distributed execution managers 146A, 146B, example multi-machine service 210, example load balancer 310, example virtual appliances 320-324, example component servers 330-336, example management endpoints 340-344, example management agents 350-356, and/or, more generally, the example systems 100 and/or 300 of FIGS. 1-6 are shown in FIGS. 7 and 8. In these examples, the machine readable instructions implement programs for execution by a processor such as the processor 912 shown in the example processor platform 900 discussed below in connection with FIG. 9. The programs may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example programs are described with reference to the flowcharts illustrated in FIGS. 7-8, many other methods of deploying, evaluating, and installing services on component servers in accordance with the teachings of this disclosure may alternatively be used. For example, the order of execution of the blocks may be changed, and/or some of the blocks described may be changed, eliminated, or combined.

As mentioned above, the example processes of FIGS. 7-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. In some examples, the example processes of FIGS. 7-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

FIG. 7 depicts a flowchart representative of computer readable instructions that may be executed to implement the node change event propagation and service reconfiguration functionality provided by the example node change event server 470 and the script library 465 of the example vA 320 of FIG. 4. An example program 700 is illustrated in FIG. 7. Initially, at block 705, a node change event (e.g., a node is added, a node is removed, a node is promoted, etc.) occurs within a cluster. In some examples, the node change event is caused by a cloud manager 138 or by any other management tool operated by a system administrator, for example. At block 710, an example node experiencing a node change event broadcasts (otherwise transmits) a node event message to the other nodes of the cluster. At a block 715, an example event listener of the node change event server 470 installed in the node that experienced the node change event receives event reporting messages from other nodes of the cluster. In some examples, the event reporting messages indicate an identity of the node that transmitted the message, which of a set of scripts were executed in response to the node change event message and whether the scripts executed in response to the node change event message were executed successfully (or unsuccessfully). Thereafter, the program ends.

FIG. 8 depicts a flowchart representative of computer readable instructions that may be executed to implement the node change event propagation and service reconfiguration functionality provided by the example node change event server 470 and the script library 465 of the example vA 320 of FIG. 4. An example program 800 is illustrated in FIG. 8. Initially, at block 805, the example event listener 510 of a node change event server 470 installed in a node (e.g. implemented using a virtual appliance 320) receives an event change message. At block 810 the example event analyzer 520 processes the event change message to identify the type of event, a first, a second, and a third node identifier, etc. At block 815, the event analyzer 520 supplies the type of event to the example folder selector 530 and transmits the remaining event message information to an example script executor 540. At block 820, the folder selector 530 accesses a script library and identifies a script folder corresponding to the type of event. In some examples, the script folder contains a set of scripts (a separate script for each service supported by the node in receipt of the event change message). At block 825, the example script executor 825 executes the scripts contained in the script folder. The scripts, when executed cause a variety of tasks to be performed including, for example, shutting down a service corresponding to the script, reconfiguring the service corresponding to the script, restarting the servie corresponding to the script, etc. At block 830, the script executor generates a report regarding the status of the scripts (e.g., whether the scripts were successfully or unsuccessfully executed, which services were reconfigured by the scripts, etc.). At block 835, the example event reporter 835 transmits event report to the node that experienced the node event change. Thereafter, the program ends.

Figure 9:
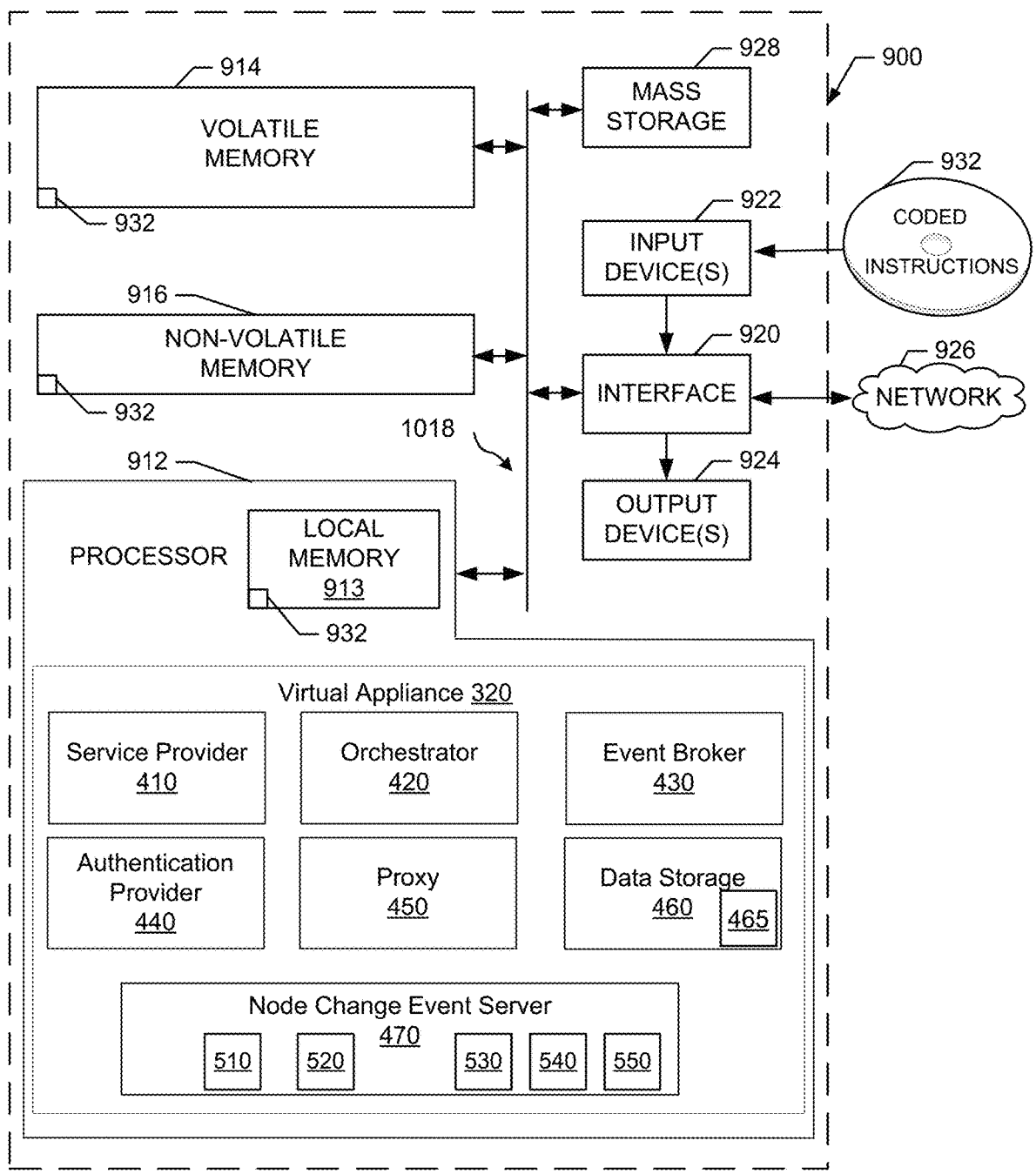
FIG. 9 is a block diagram of an example processing platform structured to execute the example computer readable instructions of FIGS. 7 and/or 8 to implement the example virtual appliance of FIG. 4.

FIG. 9 is a block diagram of an example processor platform 900 structured to execute the instructions of FIGS. 7-8 to implement the example systems, operation, and management of FIGS. 1-6. The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer.

The processor 912 of the illustrated example includes a local memory 913 (e.g., a cache), and executes instructions to implement the example systems 100, 300 or portions thereof, such as the vA 320-324, component server 330-336, management endpoint 340-344, and management agent 350-356. The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device (s) 922 permit(s) a user to enter data and commands into the processor 912. The input device(s) can be implemented by, for example, an audio sensor, a microphone, a keyboard, a button, a mouse, a touchscreen, a track-pad, a trackball, isopoint and/or a voice recognition system.

One or more output devices 924 are also connected to the interface circuit 1020 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926

(e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include flash devices, floppy disk drives, hard drive disks, optical compact disk (CD) drives, optical Blu-ray disk drives, RAID systems, and optical digital versatile disk (DVD) drives.

Coded instructions 932 representative of the example machine readable instructions of FIGS. 7-8 may be stored in the mass storage device 928, in the volatile memory 914, in the non-volatile memory 916, and/or on a removable tangible computer readable storage medium such as a CD or DVD.

In certain examples, the processor 912 can be used to implement the virtual appliance 320 (and vAs 322-324) and the component server 330 (and servers 332-336) and their components including the service provisioner 410, orchestrator 420, event broker 430, authentication provider 440, proxy 450, data storage (e.g., database) server 460, node change event server 470, script library 465, the event listener 510, the event analyzer 520, the folder selector 530, the script executor 540, the event reporter 550, etc. In certain examples, as discussed herein, the hardware of processor 912 is virtualized using virtualization such as VMs and/or containers. In the example of FIG. 9, the virtual appliance 320 can be implemented by one or more VMs or containers, so as to virtualize the hardware of processor 912.

The example methods, apparatus and systems to propagate node change events to the nodes of a cluster provide many advantages. For example, each time a node change event occurs, the other nodes of a same cluster are automatically notified with an event change message which causes the other nodes to reconfigure, using scripts stored at the other nodes, any services that need to be reconfigured to accommodate the node change event. Thus, instead of requiring the transmittal of reconfiguration files and/or scripts to the nodes of the cluster to notify such nodes of a node change event, each node is configured to include all of the scripts needed to accommodate any node change events that are reported. Further, there is no need to manually rewrite code or add code to existing script files when a node change event occurs as the scripts needed to accommodate node change events are written in advance and stored on the individual nodes of the cluster. Still further, the usage of the scripts greatly reducing the opportunities for error that are introduced by having to manually encode node event change information.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A first node of a cluster of nodes, the first node comprising:
    a node change event server of the first node, the node change event server to identify a node change event type in an event message obtained from a second node of the cluster of nodes, the event message being an application programming interface call to the first node, the application programming interface call indicating that the second node experienced a node change event corresponding to the node change event type; and
    a script library of the first node, the script library including a script folder corresponding to the node change event type, the script folder including at least one script associated with at least one action to be taken on the first node to reconcile a service supported by the first node with the node change event, the at least one script to be executed by the node change event server in response to the event message, the at least one script, when executed by the node change event server, to reconfigure the service.

2. The first node of claim 1, wherein the second node is implemented using a virtual appliance.

3. The first node of claim 1, wherein the at least one script, when executed, causes the node change event server to reconfigure the service to accommodate the node change event.

4. The first node of claim 1, wherein the node change event type is at least one of adding the second node to the cluster of nodes, removing the second node from the cluster of nodes, or promoting the second node to lead node.

5. The first node of claim 1, wherein the script folder is a first script folder and the at least one script is a first script, the script library further including a plurality of script folders, the plurality of script folders corresponding to respective node change event types and the plurality of script folders including respective scripts.

6. The first node of claim 5, wherein the first script, when executed, causes the node change event server to shut down, reconfigure, and restart the service.

7. The first node of claim 1, wherein the node change event server includes an event analyzer to analyze the event message to identify the node change event type and further identify at least one node identifier, the at least one node identifier identifying at least one of the second node, a lead node of the cluster of nodes, or replica nodes included in the cluster of nodes.

8. A method for propagating node change events to a plurality of nodes included in a cluster, the method comprising:
    analyzing, by executing an instruction with a processor associated with a first node of the plurality of nodes, a node change event message obtained from a second node of the plurality of nodes to identify a node change event type included in the node change event message, the node change event message being an application programming interface call to the processor associated with the first node, the node change event type corresponding to a node change event experienced by the second node of the plurality of nodes;
    selecting, based on the node change event type, by executing an instruction with the processor associated with the first node of the plurality of nodes, a script associated with an action to be taken on the first node to reconcile a service supported by the first node with the node change event, the script from a data storage associated with the first node; and
    reconfiguring, by executing the script with the processor associated with the first node of the plurality of node, the service.

9. The method as defined in claim 8, further including broadcasting, to the plurality of nodes including the first node, the node change event message from the second node of the plurality of nodes.

10. The method as defined in claim 8, wherein the node change event type is one of a node added event type, a node removed event type, or a node promoted event type.

11. The method as defined in claim 8, wherein the service is a first service and the script is a first script, the method further including:
  selecting, based on the node change event type, a script folder, from the data storage, the script folder including the first script and a second script; and
  reconfiguring, by executing the second script at the first node, a second service supported by the first node.

12. The method as defined in claim 8, wherein the reconfiguring of the service includes reconfiguring a first service component on the first node to enable communication with a second service component on the second node.

13. The method as defined in claim 9, wherein the second node generates and broadcasts the node change event message in response to experiencing the node change event.

14. The method as defined in claim 8, wherein the second node included in the plurality of nodes is implemented using a virtual appliance.

15. A tangible computer readable storage medium comprising computer readable instructions that, when executed, cause a first virtual appliance to at least:
  analyze, at the first virtual appliance, a node change event message obtained from a second virtual appliance to identify a node change event type included in the node change event message, the node change event message being an application programming interface call to the first virtual appliance, the node change event type corresponding to a node change event experienced on the second virtual appliance;
  select, based on the node change event type, a script associated with an action to be taken on the first virtual appliance to reconcile a service supported by the first virtual appliance with the node change event, the script from a data storage associated with the first virtual appliance; and
  reconfigure, by executing the script, the service.

16. The tangible computer readable storage medium of claim 15, wherein the node change event message is supplied to the first virtual appliance by the second virtual appliance.

17. The tangible computer readable storage medium of claim 15, wherein the node change event type is one of a node added event type, a node removed event type, or a node promoted event type.

18. The tangible computer readable storage medium of claim 15, wherein the service is a first service, the script is a first script, and the instructions, when executed, cause the first virtual appliance to:
  select, based on the node change event type, a script folder, from the data storage, the script folder including the first script and a second script; and
  reconfigure, by executing the second script, a second service supported by the first virtual appliance.

19. The tangible computer readable storage medium of claim 15, wherein the instructions, when executed, cause the first virtual appliance to reconfigure the service by executing the script includes reconfiguring a first component of the service installed on the first virtual appliance to operate with a second component of the service installed on the second virtual appliance.

20. The tangible computer readable storage medium of claim 15, wherein executing the script causes the service to stop operating on the first virtual appliance, to be reconfigured on the first virtual appliance, and to be restarted on the first virtual appliance.

* * * * *